Figure 1:
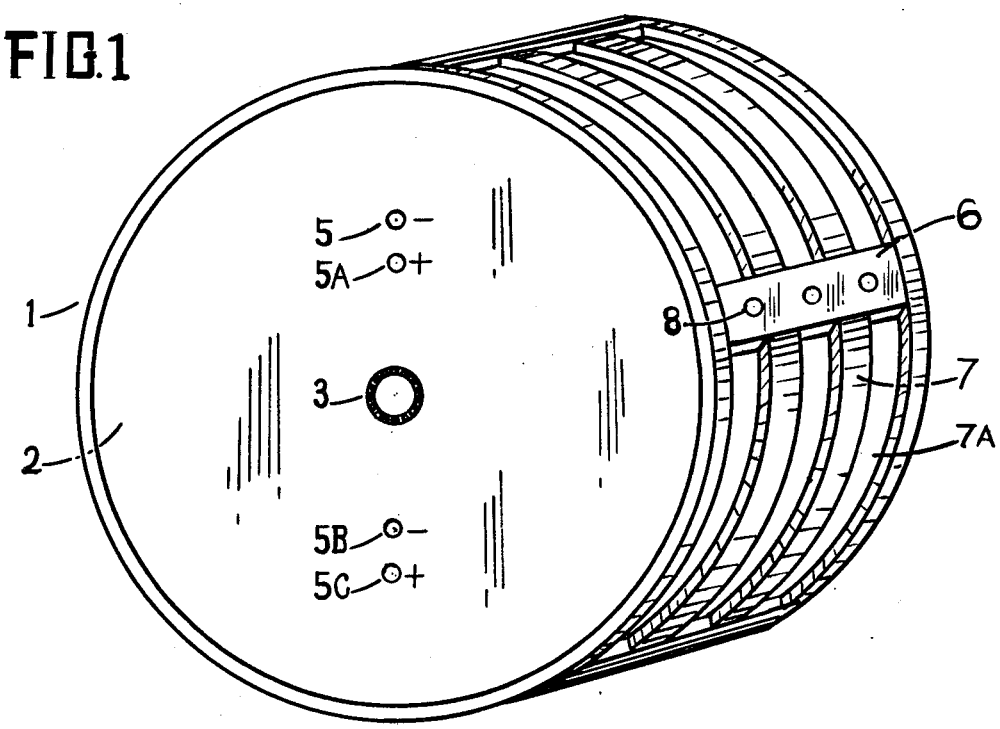

United States Patent [19]

Miyada

[11] 4,129,795
[45] Dec. 12, 1978

[54] ELECTROMAGNETIC PISTON ENGINE
[76] Inventor: Thomas S. Miyada, P.O. Box 430, Summit, N.J. 07901
[21] Appl. No.: 773,422
[22] Filed: Feb. 28, 1977
[51] Int. Cl.² .............................................. H02K 7/06
[52] U.S. Cl. ........................................ 310/24; 417/416
[58] Field of Search ........................ 310/14, 20, 23, 29, 310/30; 417/416–418

[56] References Cited
U.S. PATENT DOCUMENTS

| | | | |
|---|---|---|---|
| 3,437,044 | 4/1969 | Sanders et al. | 310/24 X |
| 3,542,495 | 11/1970 | Barthalon | 310/24 X |
| 3,942,913 | 3/1976 | Bokelman | 310/24 X |
| 3,949,249 | 4/1976 | Wiseley et al. | 310/17 |

Primary Examiner—Donovan F. Duggan

[57] ABSTRACT

The subject of this invention is a piston engine without cranks and crankshaft. Its pistons are operated by neither steam nor gaseous combustion. It depends on electrical energy, but in a manner quite different from those of the conventional electric cars and motors. Its principal parts include electromagnets having iron cores, electromagnets with magnetic-fluid cores, permanent magnets, pistons that could move reciprocatingly in said magnetic-fluid cores, hydraulically operated turbine receiving its pressure from said pistons, electromagnetically operated polarity wheel that performs functions resembling those of commutators and special computers in the selection, reversal, and timing of currents to insure the coordinated movements of the various parts of the engine.

It may be operated as a direct current engine with energy derived from portable storage batteries or generators that are independent of fossil fuels. It does not pollute the atmosphere.

7 Claims, 44 Drawing Figures

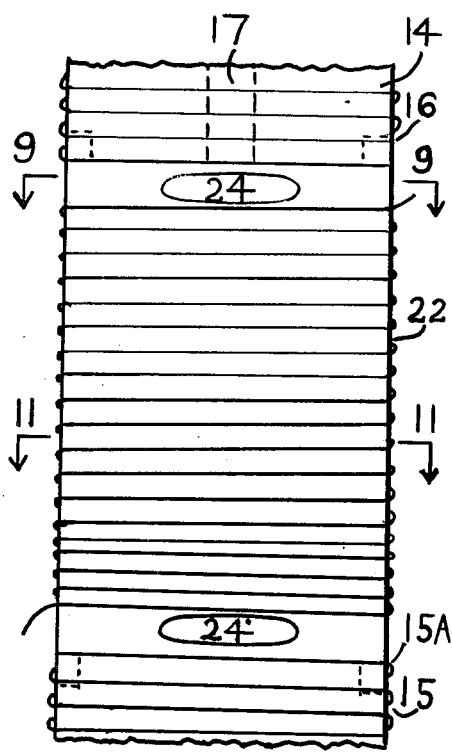
FIG. 7
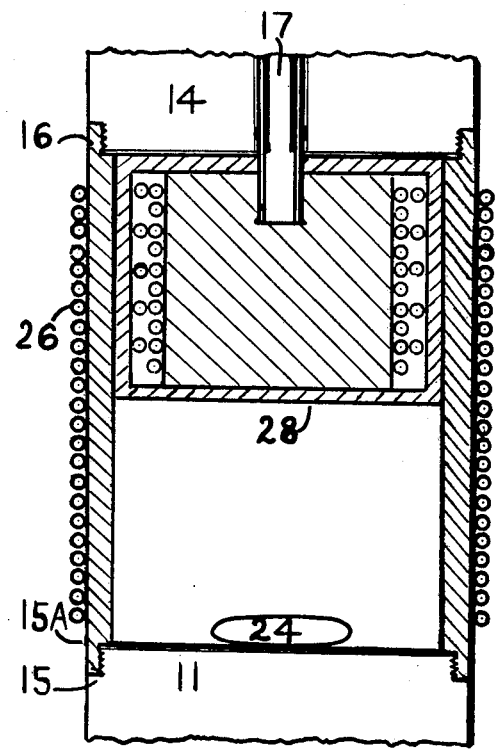
FIG. 8
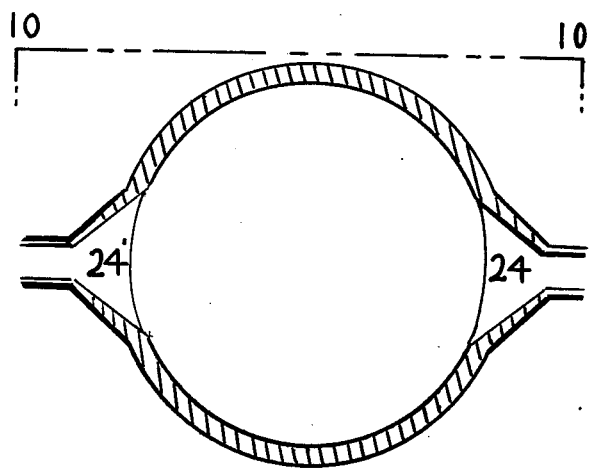
FIG. 9 ↑
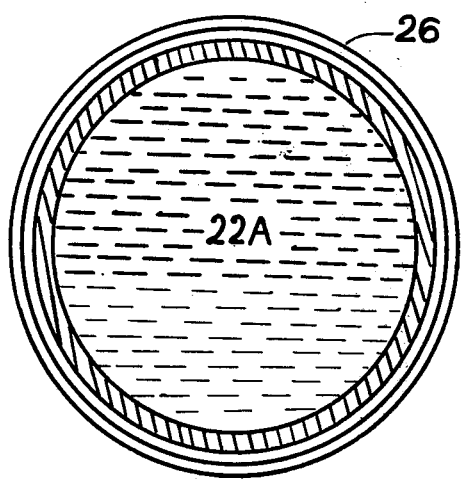
FIG. 11 ↑
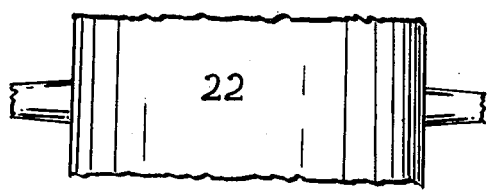
FIG. 10
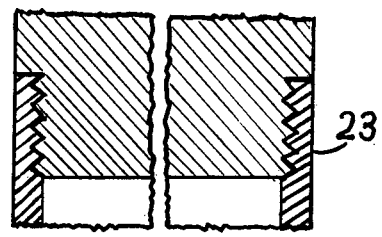
FIG. 12

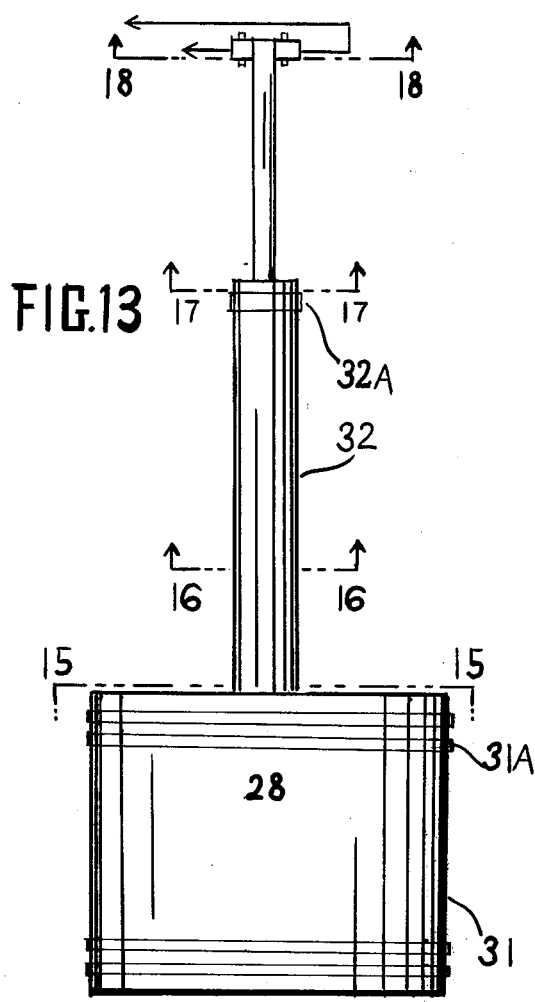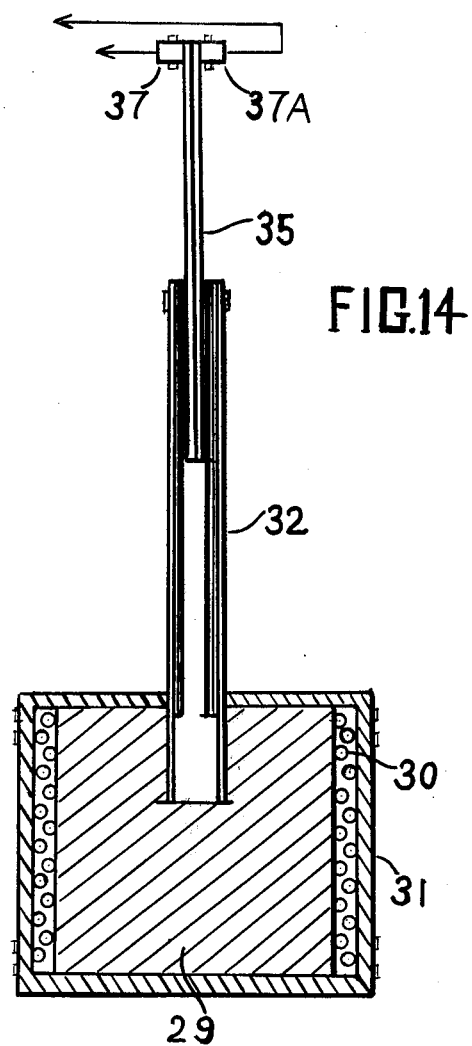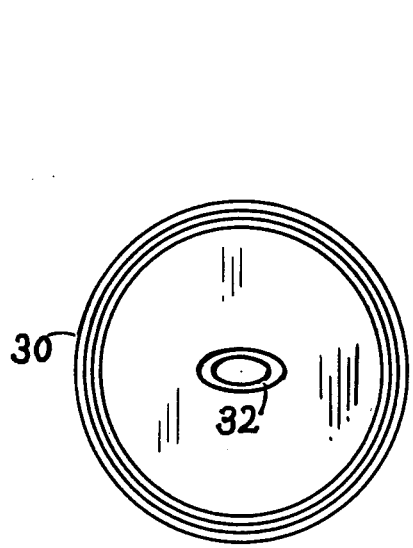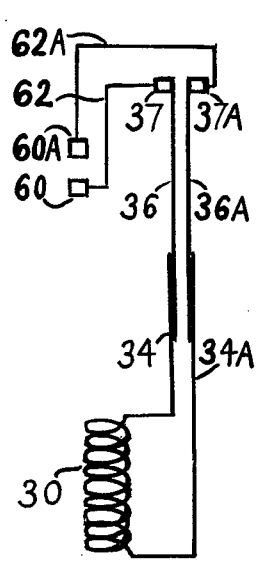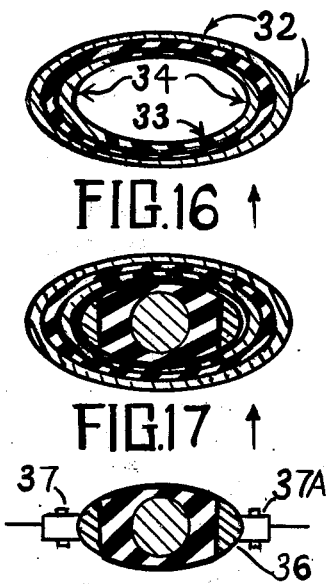

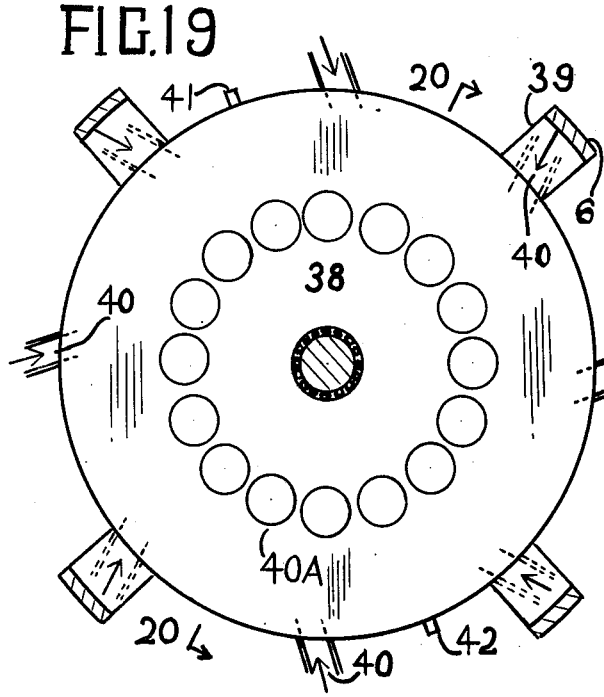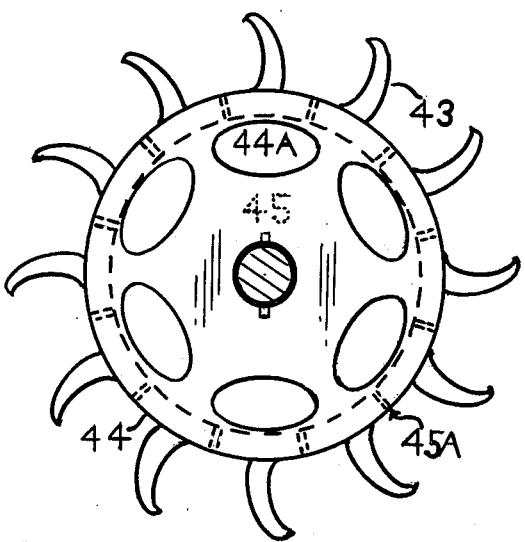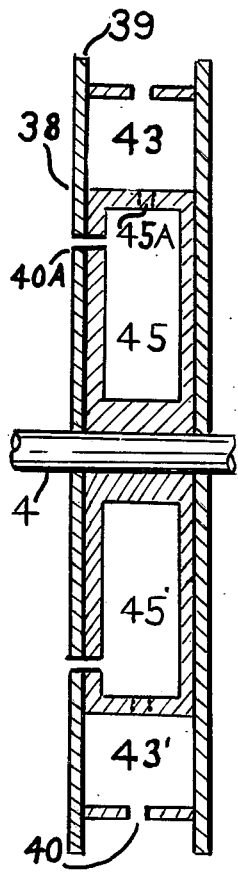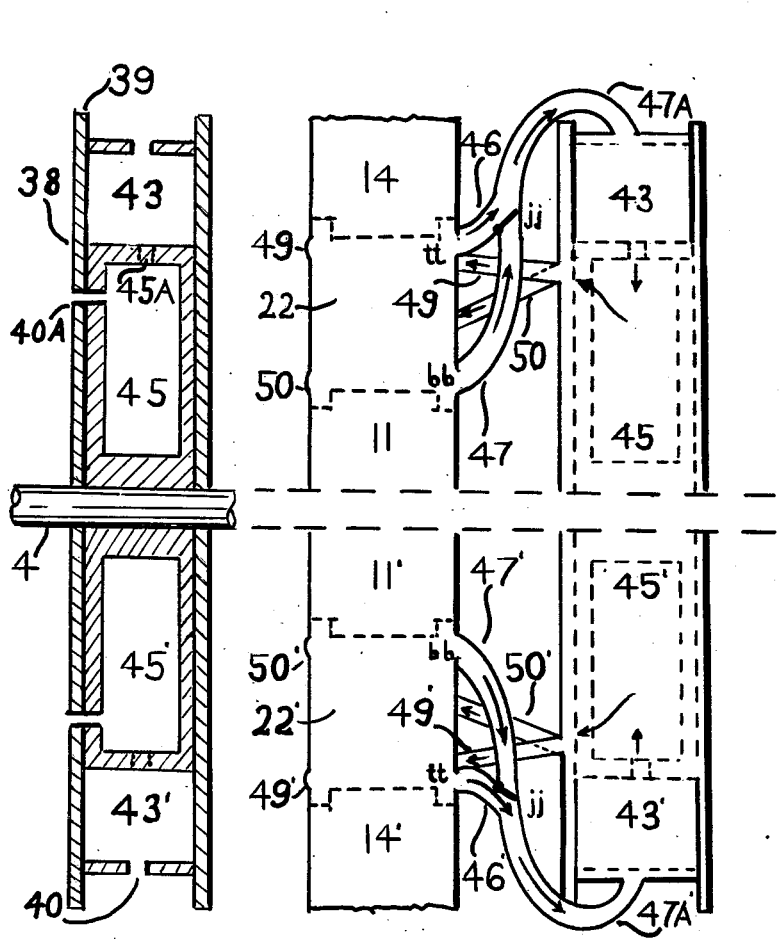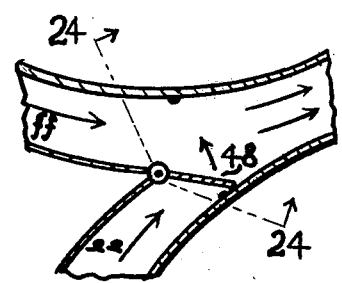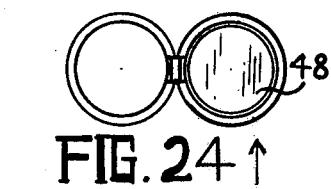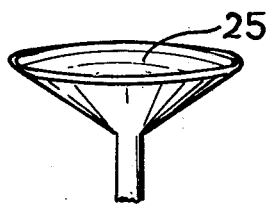

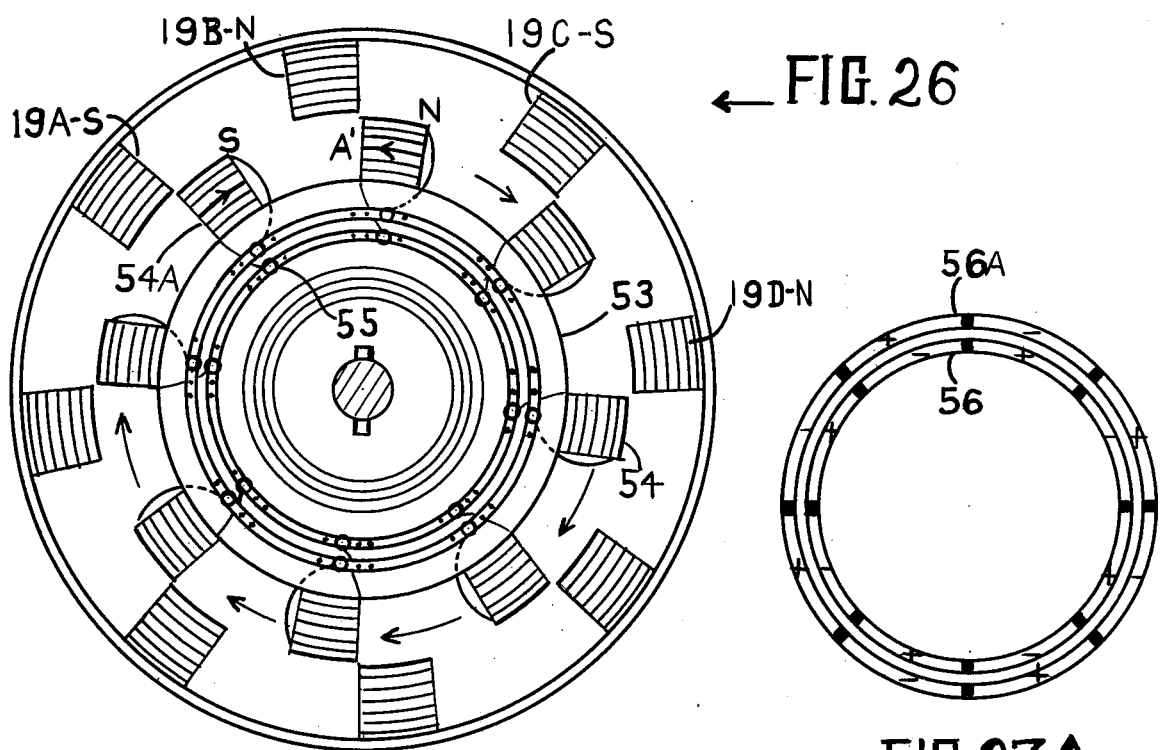
FIG. 26
FIG. 28
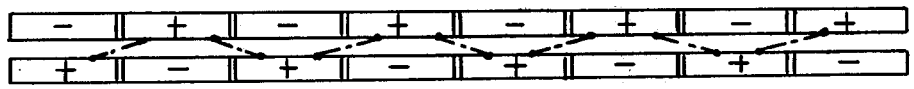
FIG. 29
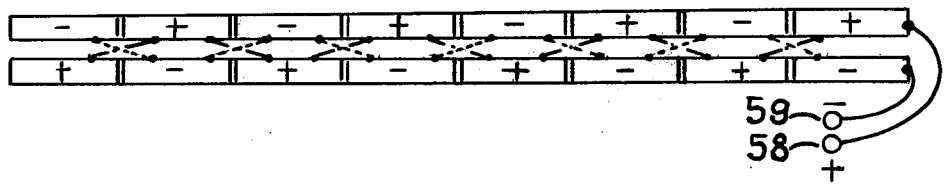
FIG. 30
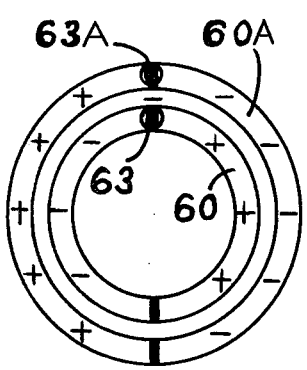
FIG. 31
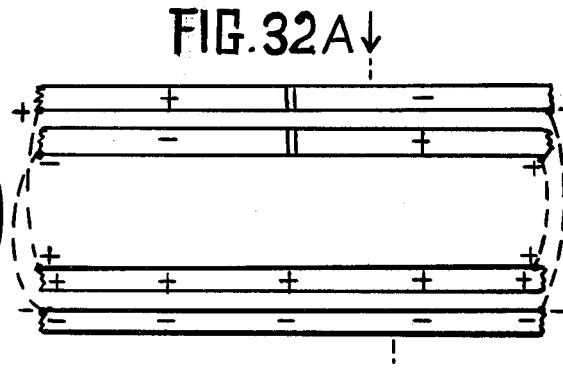
FIG. 32A
FIG. 32B
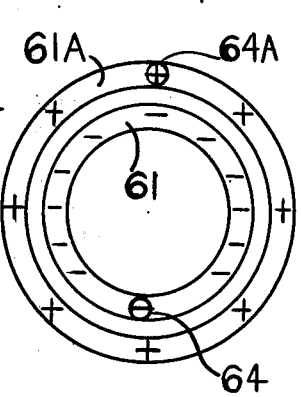
FIG. 33

ELECTROMAGNETIC PISTON ENGINE

SUMMARY (including background and purposes)

Trolley cars and trains that depend on electricity from overhead lines have shown that electricity is better than steam or gasoline in many ways. Attempts to run cars with power from storage batteries have been successful for short distances, but failed to become popular because there are not enough spaces on such vehicles to carry the quantity of batteries required for an average business or out-of-town trip. Either a new type of electric engine or lighter and more compact power source is indicated for a solution.

In designing the present engine, I avoided the shortcomings of conventional electric motors. I also shelved my electric car that has electrically operated pistons that are connected to cranks and crankshaft. The former takes too much current, and the latter has neither the power nor the speed. In the latter case, the engine was not only sluggish, it was too costly and mechanically cumbersome to equate the rigidity of crankshaft connected pistons to the flexibility of electromagnetic movements.

The present invention has new and useful features, which, in combinations, produce a new type of engine that consumes comparatively less energy than other engines of comparative power known to me. It also has several components, which are not unique when taken individually, but in their combined form they lose their conventionality and become important new factors in the static and the dynamic features of the new engine.

This invention is not an electric motor. It is an engine, a combination of many units whose coordinated functions produce a usable mechanical movement or power. Just as a conventional gas turbine engine is composed of a gas compressor, pump, burners, turbine, heat exchanger, electric system, motor, lubricating device, ventilating system, flywheel, etc., this engine has many units or parts, such as permanent magnets, electromagnets with metallic cores, electromagents with magnetic-fluid cores, turbine, polarity wheel, etc., that contribute to the overall purpose of the invention.

The principal magnets used in this engine are made of steel or alloys used in producing permanent magnets. A plurality of these magnets, evenly spaced, extend from the periphery of the engine's casing to about one-third of the way in the direction of the engine's axis. A maching number of evenly spaced permanent magnets radiate from the hub-like center of the engine towards the magnets that are extending from the periphery. There is a space of about one-third the radius of the casing between the end of each permanent magnet extending from the periphery and that of each permanent magnet radiating from the hub-like center. A solenoid having a core of magnetic fluid and an electromagnetic piston are positioned in each of the said space.

A polarity wheel, keyed to the drive shaft, changes the polarity of the said fluid cored solenoids, and at the same time it produces an opposite polarity in each of the pistons, thus causing the latter to move up and down in a pumping action to force fluid, via pipes, into the turbine housing. The fluid pumped into the said housing causes the turbine, which is keyed to the drive shaft, to rotate.

Modern permanent magnets have great strength and last long. The permanent magnets used in this engine have a special feature in the form of windings that resemble those found on electromagnets. However, no current is permitted to flow through the windings on the permanent magnets while the engine is in operation.

All the terminals of the windings on said permanent magnets have attachments marked with the plus and the minus signs so that they could be connected to external magnitizing device when the engine is not in use. Since they could retain their strength for a long time, they pose no problem that requires frequent care. The potential power stored in the permanent magnets will help them to perform their share of the work in running the engine without draining the storage batteries, thus causing the latter to last considerably longer. Only the solenoids with the magnetic fluid cores, the pistons, and the polarity wheel receive current from the portable storage batteries while the engine is in operation.

In designing and introducing the present engine, I have kept foremost in mind a power source that will not pollute the atmosphere. The immediate and practical purposes of this engine when use to power vehicles are to avoid the consumption of fossil fuels, and to reduce the number and size of storage batteries that are currently required to be carried on electric cars. This is done by storing enough magnetic energy or power in the engine's configuration of permanent magnets before the engine starts on its journeys. The secondary purpose of this invention is to help set a trend in the designing and construction of prime movers that depend on transmissible, portable, and non-polluting energy, the electricity, whose supply is coextensive and coexistent with solar heat, natural and artificial waterfalls, tides, chemicals, wind, magnetic and paramagnetic metals, none of which will ever become scarce in the life span of our planet, and should last even after the genocidally inclined Homo sapiens have made themselves extinct.

A detailed description of the engine follows after the definition of certain terms and words used herein and the brief explanations of the accompanying drawings.

DEFINITIONS

The following words, initials, symbols, and terms found in this specification and claims are used in the sense defined hereunder:

(a) UP and DOWN, UPWARD and DOWNWARD: Within the circular walls of the engine or circumference thereof, or in any circular body or cylinder, the circumference of the periphery is up, and the center or axis is down, unless the context clearly indicates otherwise. It follows that any direction toward the center or axis is downward, and all directions toward the circumference or periphery is upward.

(b) LEFT and RIGHT: Left and right mean the viewer's and the explainer's left and right, and not the left and right inherent in the passive drawings or objects except when the possessive noun "its" or "their" or the preposition "of" modifies or links the drawing or object concerned. The explainer and the viewer are assumed to be standing or sitting on the same side.

(c) PLUS AND MINUS: The direction of electron current in these specification and drawings and claims is in accordance to the accepted electron theory. The current always leave the negative side (−) of a battery or other sources of energy, and completes the circuit by entering the plus (+) terminal of the same source. (In constructing this engine, the plus and the minus signs may be used in the long established conventional sense if the person skilled in the art remains consistent throughout. Since it is only a difference in nomenclature, the result will be equally satisfactory as long as the old and the new practices are not mixed.)

(d) NORTH and SOUTH poles: The poles of electromagnets in this engine are determined according to Ampere's left hand rule, i.e., If the coil is grasped with the left hand with the fingers wrapped around it in the direction of electron flow, the thumb will point toward the north pole. The magnetic flux extends or flows from the north p. to the south p. in external circuits, and from the south p. to the north p. in internal circuits of the metals or solenoids concerned. (It will be equally satisfactory if the right hand rule is used provided the flow of electric current is defined in the old conventional sense, and the person skilled in the art remains consistent and does not use the sinistral and the dextral methods interchangingly.)

(e) cN, cS, N-S, S-N: cN means a constant north pole; cS, a constant south pole; N-S or S-N, a pole that changes periodically with the rotation of the polarity wheel.

(f) Obverse and reverse: the surface or flat side of an assembled polarity wheel, ring, magnet, or wall facing in the general direction of the assembled turbine is the obverse or front of that object, and the surface or flat side of an assembled turbine, wall, ring, or magnet facing in the general direction of the assembled polarity wheel is the reverse or back of that object.

DRAWINGS

FIG. 1 — A perspective view of the engine's casing.

Figure 2:
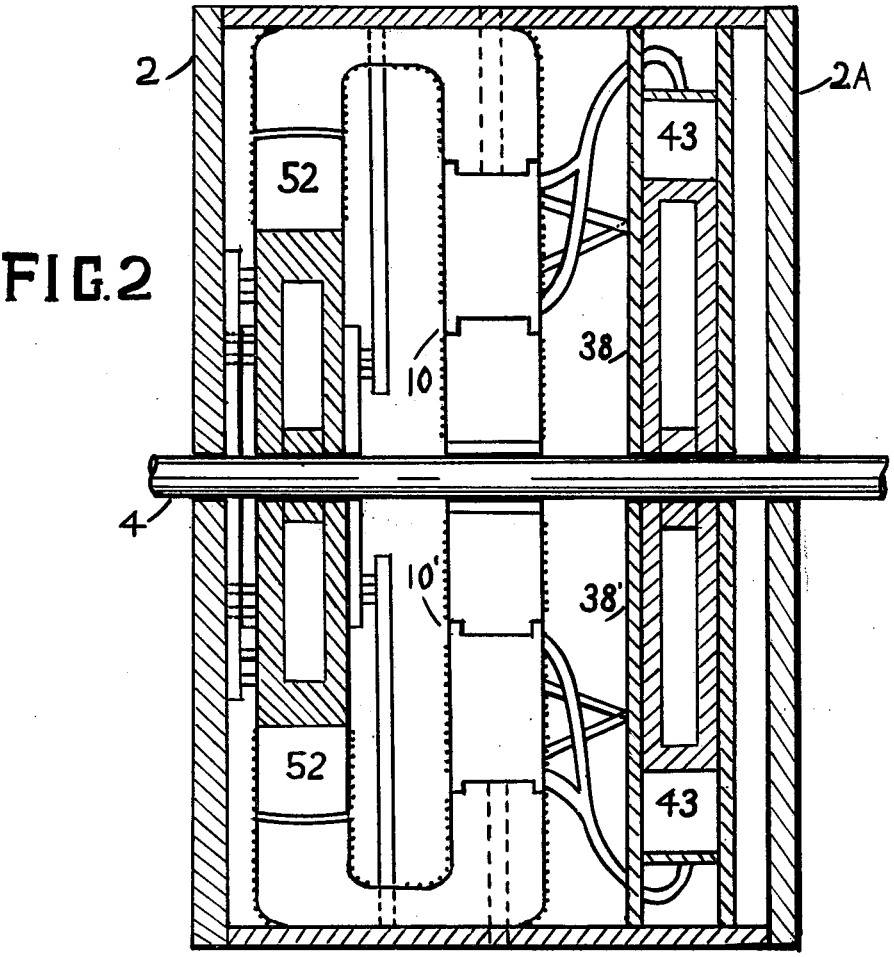

FIG. 2 — A vertical sectional view through the center of the engine.

Figure 3:
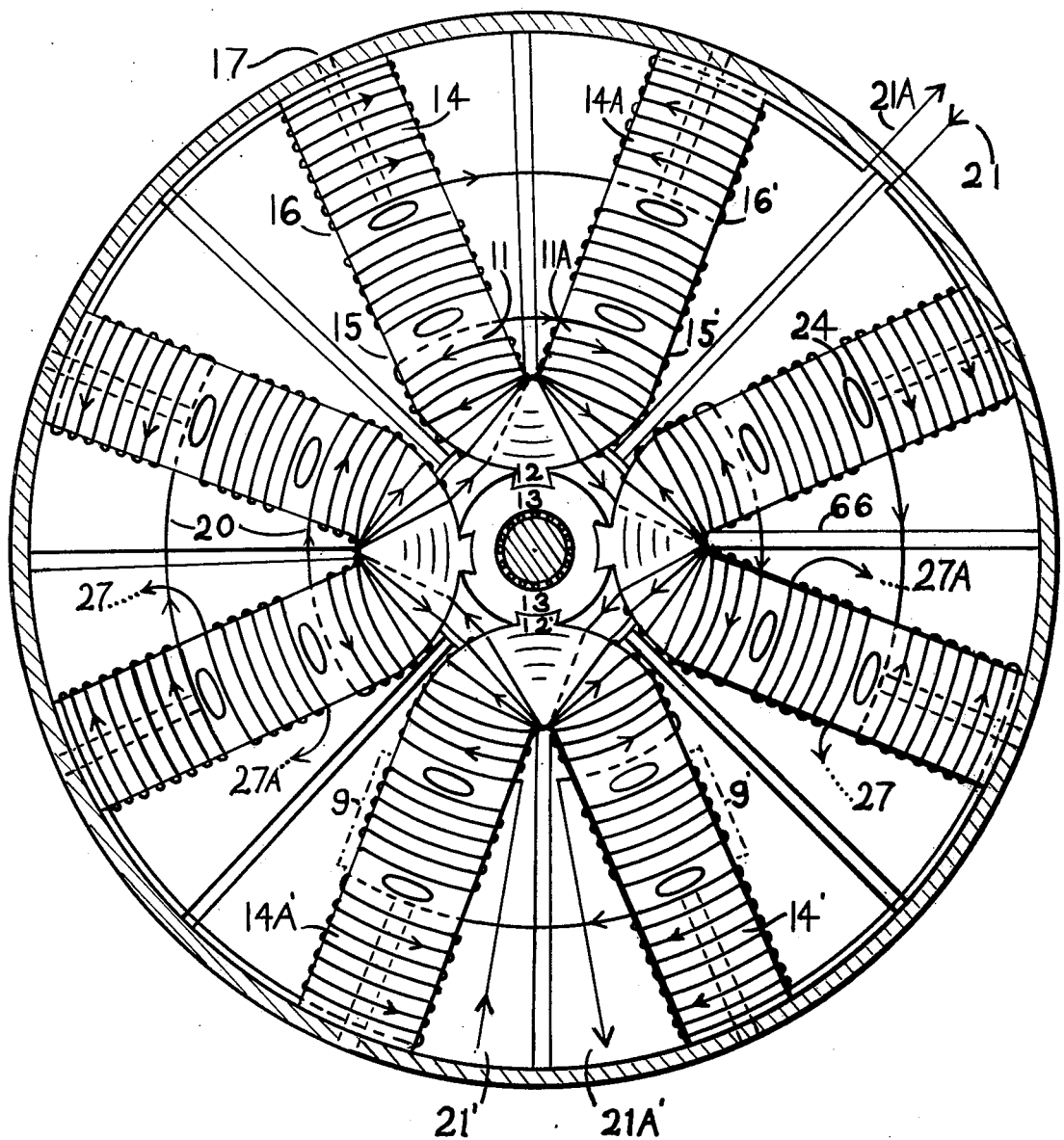

FIG. 3 — An obverse elevation view of the configuration of magnets.

Figure 4:
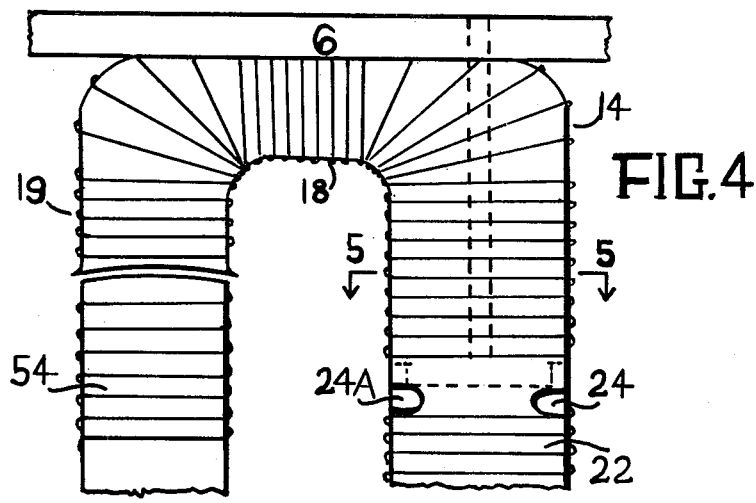

FIG. 4 — A view of the magnets taken substantially upon the plane indicated by the section line 4—4 in FIG. 3.

Figure 5:
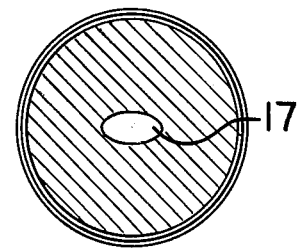

FIG. 5 — A cross section of the permanent magnet taken through section line 5—5 in FIG. 3.

Figure 6:
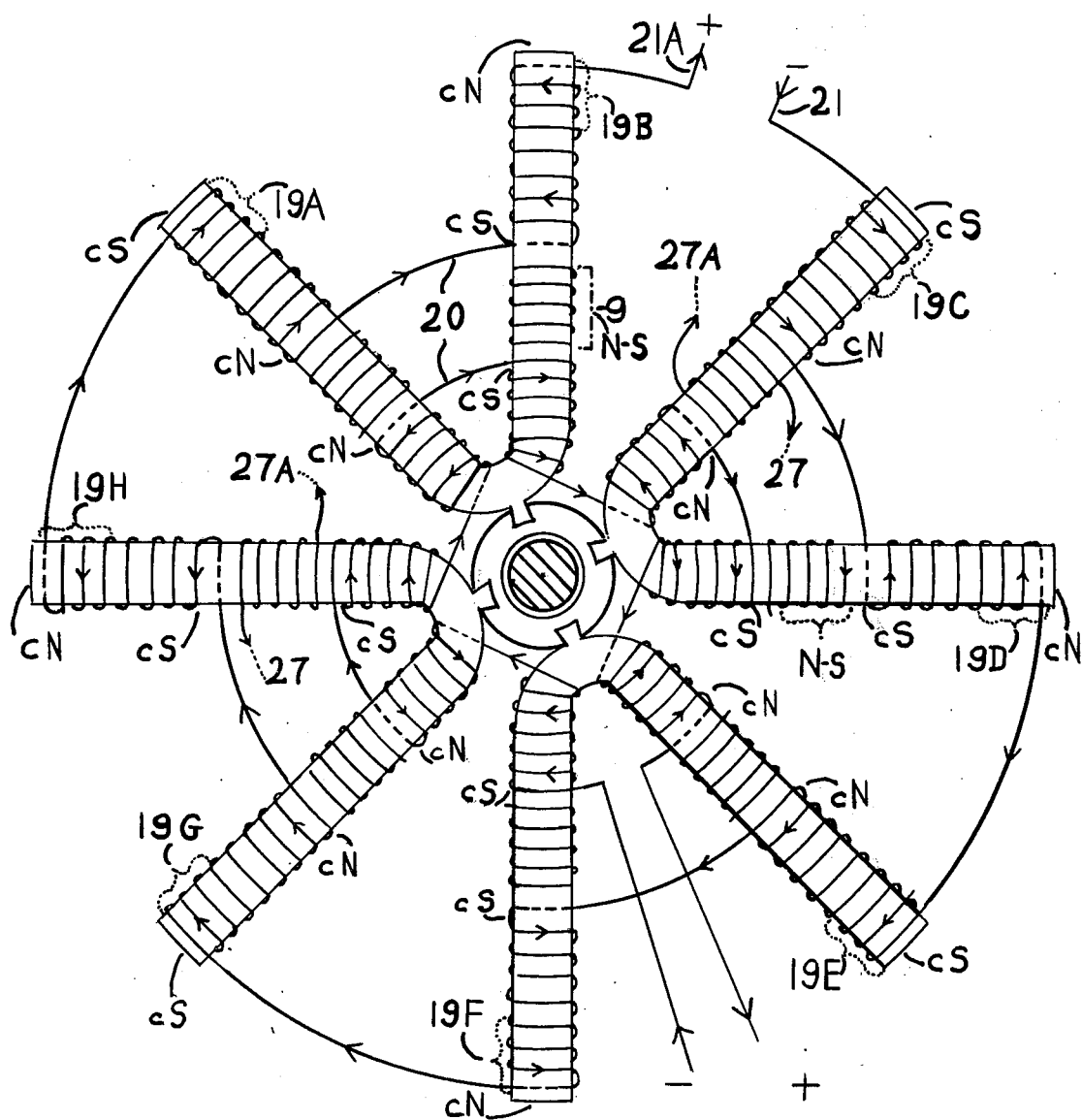

FIG. 6 — Wirings on the magnets.

FIG. 7 — An external view of one of the identical solenoids and the adjoining permanent magnets, indicated by the brace and numeral 7 in FIG. 3.

FIG. 8 — A vertical cross sectional view of the solenoid taken substantially through its center.

FIG. 9 — A cross sectional view of the solenoid and its elliptic outlets and inlets taken on the plane indicated by the line 9—9 in FIG. 7.

FIG. 10 — A view of the external part of the solenoid represented by the line 10—10 in FIG. 7.

FIG. 11 — A cross section of the solenoid taken on the line 11—11 of FIG. 7.

FIG. 12 — A vertical cross section taken down the center of the coupled threaded ends of the solenoid and the permanent magnet.

FIG. 13 — An external view of the piston and its tubular extension.

FIG. 14 — A vertical cross sectional view of the piston and its tubular extension taken down through their center.

FIG. 14A — Conducting lines of the piston.

FIG. 15 — A plan view of the piston taken on the plane shown by line 15—15 of FIG. 13.

FIG. 16 — A cross section of the piston's tube taken on the plane indicated by the line 16—16 of FIG. 13.

FIG. 17 — A cross section of the piston's tube and the rod taken on the plane of line 17—17 of FIG. 13.

FIG. 18 — A cross sectional view of the terminal of the piston's tube and rod take on the plane marked by the line 18—18 in FIG. 13.

FIG. 19 — A view of the reverse side of the turbine housing and its concentric openings, and the drive shaft.

FIG. 20 — A central vertical cross section of the turbine housing and the turbine taken on the plane represented by the line 20—20 in FIG. 19.

FIG. 21 — An elavation view of the turbine removed from its housing.

FIG. 22 — A view of the pipelines connecting the turbine housing and the solenoid (diagrammatic).

FIG. 23 — A longitudinal cross sectional view of two pipelines joining to become a single line.

FIG. 24 — A cross section of the pipes shown in FIG. 23 taken at a plane marked by the line 24—24 in the same figure.

FIG. 25 — A sectional view of the one way inlet valve.

FIG. 25A — A perspective view of the elliptic end of each pipe that communicates with the interior of each solenoid.

FIG. 26 — A view of the reverse side of the polarity wheel showing the poles and the brushes. The poles protruding downward from the periphery are field poles, or extensions of the permanent magnets from the obverse side.

FIG. 27 — Electrical contacting rings mounted on the inner surface of the casing's radial wall. (For the use of the polarity wheel only.)

FIG. 28 — The same twin contacting rings shown in FIG. 27, except that they are unrolled into twin strips, and their minus sections connected together with conductors.

FIG. 29 — The same twin strips shown in FIG. 28 with the plus sections connected together with conductors.

FIG. 30 — The same strips as shown above but with all the plus sections connected together and ending in a plus terminal (58), and all the minus sections connected together and ending in a minus terminal (59).

FIG. 31 — Paired front conducting rings mounted on the obverse side of the polarity wheel for the control of the polarity of the solenoids and the pistons.

FIG. 32A — Paired front rings shown in FIG. 31 unrolled into two strips. (For illustration only.)

FIG. 32B — This shows how the paired strips in FIG. 32A would look if the two plus sections in FIG. 32A are joined together with conductors and placed on the top strip, and all the minus sections joined together and placed on the bottom strip.

FIG. 33 — This shows the same strips in FIG. 32B rolled into concentric paired rings, and mounted on the reverse side of the polarity wheel.

Figure 34:
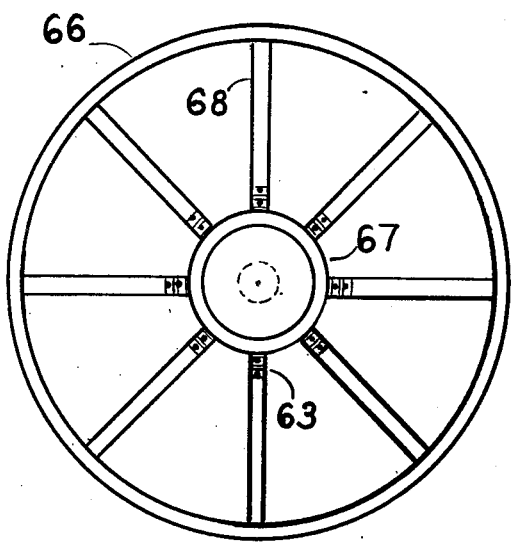

FIG. 34 — An elevation view of a wheel-like device whose spoke-like arms serve as return paths for the magnetic flux.

Figure 35:
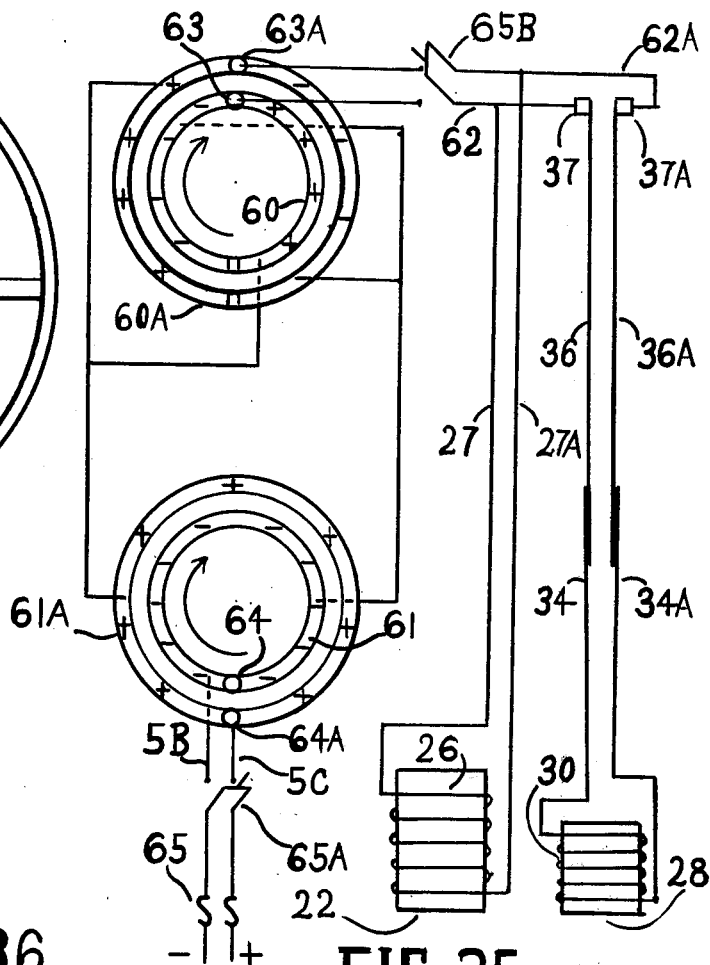

FIG. 35 — Schematic presentation of the wirings of the solenoid, piston, and the paired front rings.

Figure 36:
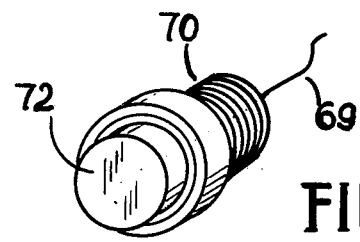

FIG. 36 — A perspective view of the conducting brush.

Figure 36A:
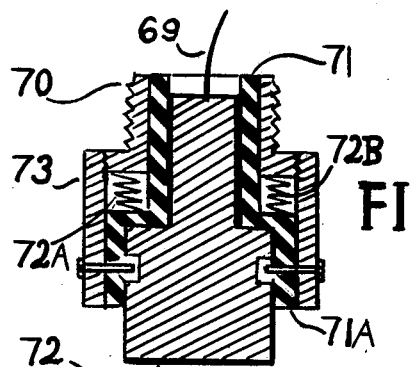

FIG. 36A — A vertical cross section of the brush taken through its center.

Figure 37:
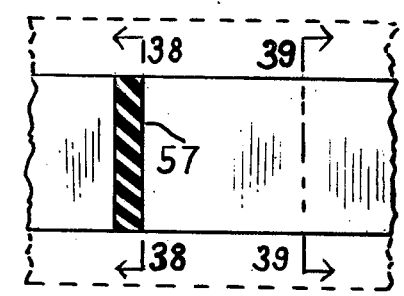

FIG. 37 — A view of the contacting surface of a section of the conducting front and rear ring.

Figure 38:
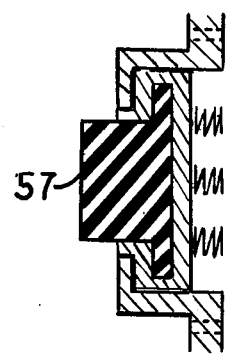

FIG. 38 — A cross sectional view of the insulation between the plus and the minus sections of the conducting ring taken on the line 38—38 of FIG. 37.

Figure 39:
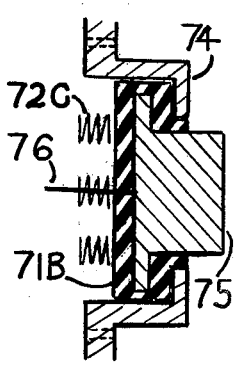

FIG. 39 — A cross sectional view of the conducting ring taken on the plane shown by the line 39—39 in FIG. 37.

Figure 40:
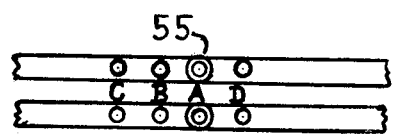

FIG. 40 — The conducting-brush holder on the polarity wheel.

It is understood that this invention is not to be construed as limited to the particular forms illustrated or described herein since the forms were chosen for the purpose of disclosure, and, therefore, should be regarded as illustrative rather than restrictive.

THE CASING

The casing (1), shown in FIG. 1, of this engine is constructed in a substantially cylindrical shape with its length generally shorter than its diameter. Its radial walls (2 and 2A) are solid, except for openings (3) for the central drive shaft (4), and the electrical outlets (5, 5A, 5B, 5C). The two radial walls, with their surfaces positioned parallel to each other, and separated from one another by a length more or less than their radius, are held together by a plurality of flat bars (6), whose ends are bolted to the peripheral sides of the said walls. The said bars are, in turn held in position by a plurality of hoop-like bars (7), the latter being bolted to the former. In general appearance, the casing looks like a round bird cage with ample openings (7A) for air circulation. A plurality of threaded holes (8) are provided in the longitudinal and circular bars for bolts needed to hold or secure the engine to appropriate support.

THE LOCATION OF THE MAJOR COMPONENTS

FIG. 2 is a vertical cross sectional view of the engine taken through its center. It shows from left to right the positions of the major components: the casing's radial wall (2), the polarity wheel (52), the configuration of magnets (10) which includes the solenoids and electromagnetic pistons, the housing (38) containing the turbine (43), the radial wall (2A), and the drive shaft passing through them.

THE PERMANENT MAGNETS

The permanent magnets, (14) (11), are arranged in a configuration that looks like equal-length streets radiating in all directions from a central park. FIG. 3 shows the obverse side of the permanent magnets arranged in the pattern described. These magnets are arranged in sets. Each set consists of joined lower arms (11 and 11A) and two upper arms (14 and 14A), and is made in the form of a capital letter V with the lower side rounded and the extremity (12) dovetailed, and securely attached to the hub (13).

Each lower arm (11) of each set starts from the hub (13) and extends in the direction of the periphery of the casing. After reaching a point (15A) at a distance equal to about one third the radius of the casing as measured from the central drive shaft, the arm is cut off, and its free end threaded (15). After skipping a space (9) whose length is equal to about one-third the radius of the casing, the upper permanent magnet (14) starts with a threaded free end (16) and extends in the direction of the periphery. Up to the point it touches the casing, this arm (14) has a long passageway bored through its axis, said passageway (17) having an elliptic cross section. Near or at the periphery, the said arm flattens and bends (18) over to the reverse side and then proceeds a short distance downward in its original shape to serve as a field pole (19) of the polarity wheel (52). FIGS. 7, 8, and 12 shows details of 9, 15, 15A, 16, and 17.

The bended section of the magnet (14) is shown in FIG. 4 and is identified by the numeral 18. FIG. 5 is a cross section of the permanent magnet taken on the line 5—5 of FIG. 4.

Any practical number of permanent magnet sets may be used. In the preferred embodiment, there are four sets of such magnets. Since all the sets of magnets used in this engine are identical, the above description applies to all.

Unlike the conventional kinds, the permanent magnets used in this engine have conducting wires (20) wound around them. Since these permanent magnets have enough power to perform their assigned duty, the conducting wires wound around them are not energized when the engine is in operation. Naturally, they do not drain any current from the storage batteries. The terminals (21, 21A) and all the other terminals of the conductors around the permanent magnets have attachments with the proper plus and minus signs placed thereon so that they may be easily connected to external power source for renewal of magnetic power whenever the engine is not being operated. The diagram of the winding is shown in FIG. 6.

The sections of the magnets marked with braces and alphanumeric notations, 19A to 19H, in FIG. 6 are actually bent over to the other side to be used as field poles of the polarity wheel. The arrows indicate the direction in which the electron current will flow when the terminals marked plus and minus are connected to the appropriate terminals of the external source of power.

SOLENOIDS

Each solenoid (22) of this engine consists of a comparatively thick-walled iron cylinder, an external winding of insulated conductors disposed in a plurality of layers (26), and a core of magnetic fluid (22A). See FIGS. 7, 8, and 11.

Each solenoid is positioned in the space (9) between the threaded end (15) of each permanent magnet (11) that rises from the hub (13), and the threaded beginning (16) of an upper permanent magnet (14) that proceeds toward the periphery. Both ends of the solenoid are also threaded. The solenoids are securely joined to the permanent magnets with suitable couplings (23), but may be removed without disturbing the permanent magnets from their positions.

Every solenoid used in this engine is substantially identical. An external close-up view of one of them is shown in FIG. 7. A vertical cross sectional view of it taken down through its center is shown in FIG. 8. The couplings are identified as (23), the narrow elliptic outlets (24), and the winding as (26) in FIG. 8. There is also an elliptic opening on the back side diametrically opposite of each elliptic opening shown in FIG. 7. Because of the pressure existing in the pipelines that connect each solenoid with the turbine housing, the solenoid always has a fluid core (22A).

Since a solenoid with a fluid core is more efficient than one with an air core, the present invention uses a core with the greater permeability. The fluid used as a core in each solenoid of this engine may be water, alchohol, oil, ethylene glycol, or other liquid containing not less than one cubic centimeter of iron powders or other fine magnetic particles per liter of liquid. Since such a solution has a magnetic property, the solenoid is described herein as one with a magnetic fluid core.

In FIGS. 7, 9 are two views of the elliptic openings (24, 24') of the solenoid. FIG. 25A shows the opening (25) of each pipe welded or securely fastened to each elliptic opening (24, 24') of the solenoid.

FIG. 11 is a cross sectional view of the solenoid taken on the plane of the line 11—11 in FIG. 7, and FIG. 12 is a sectional view of the coupling (23) taken vertically down the axial plane of the solenoid. FIG. 10 is a view of the pipelines as seen from the direction of the line 10—10 in FIG. 9.

Each solenoid has a winding (26) whose terminals (27, 27A) join the conductors (62 and 62A) from the piston before they contact the paired rings (60) on the obverse side of the polarity wheel. The wiring is detailed in FIG. 35.

THE ELECTROMAGNETIC PISTONS

Each solenoid contains an electromagnetic piston (28). An external view of the piston and its tubing is shown in FIG. 13. A vertical cross section of it taken down through its middle is shown in FIG. 14.

The piston (28) consists of an iron core (29) and a winding (in several layers) of insulated conductors (30), which are hermetically enclosed in a cylindrical container (31). The outer surface of the said container has a plurality of circular grooves encircling it, each groove retaining a seal. There are same number of grooves (31A) around the upper section and the lower section of the container (31). A plan view of the piston taken along the line 15—15 in FIG. 13 is shown in FIG. 15.

A nonmagnetic strong tubing (32) is securely attached or anchored in the axis of the piston, said tubing having a length equal to about four-fifths of the passageway (17) found in each of the upper permanent magnets (14) shown in FIG. 3. The inner surface (33) of the wall of the said tubing is insulated and has two conducting nonmagnetic strips (34-34A) positioned diametrically opposite of each other and securely attached to said surface. A cross section of the tubing taken on the plane marked by the section line 16—16 in FIG. 13 is shown in FIG. 16. The tubing is provided with a seal (32A) that encircles its upper end, and the passageway (17) in the said permanent magnet has a seal in its lower opening having the shape and size that will permit the reciprocating movements of said tubing.

In each of the passageway (17) that runs through each of the upper permanent magnets (14) is a rod (35) made of straight nonconducting tube with nonmagnetic metallic rod for its core, and having two exposed nonmagnetic conducting strips (36 and 36A) positioned diametrically opposite of each other and securely attached to the nonconducting surface. The upper end of the rod (35) is securely attached to the casing's peripheral bar, and its conducting strips are in contact with brushes (37 and 37A). FIG. 18 is a cross sectional view of the rod and the brushes taken along the line 18—18 in FIG. 13, while FIG. 17 is a cross sectional view of the same rod inside the tubing (32) as taken along the line 17—17 in FIG. 13.

The cross section of the passageway (17) and that of the tubing (32) are elliptical. This shape prevents the said piston, whose cross section is concentric, from turning axially and disconnecting the circuit that energizes its core.

THE WIRING OF THE PISTON AND CONNECTIONS

Referring to FIG. 14A, the wiring of each piston starts from its bottom section and proceeds upward, and consists of insulated conductors disposed in a plurality of layers. The terminals thereof are connected to a pair of nonmagnetic conducting strips (34)(34A) located in the tubing (32). These conductors are in turn in contact with nonmagnetic strips (36 and 36A) of the rod (35), which are also in turn in contact with the brushes (37 and 37A). From the brushes, the lines (62 and 62A) proceed on to the contacting rings (60) located on the obverse side of the polarity wheel.

ASSEMBLING OF THE SOLENOIDS AND PISTONS

The tubing (32) of the piston (28) is inserted into the passageway (17), and the rod (35) is inserted into the tubing, making it sure that the conducting strips of both the tubing and the rod are in contact. When this is done, the screw (35A) holding the upper end of the rod (35) is tightened. The piston is placed inside the solenoid. The threaded upper end of the solenoid is attached to the threaded lower end of the upper permanent magnet (14), and the solenoid's lower threaded end is coupled to the threaded end (15) of the lower magnet (11), which can be moved axially in and out of the hub. The vacant space in each solenoid's interior is filled with fluid already described.

THE TURBINE AND ITS HOUSING

The housing (38) for the turbine (FIG. 19) has a general shape of a cylinder. Its radial walls, in assembled position, are parallel to the radial walls of the casing and the obverse side of the magnetic configuration (FIG. 3.). It is held by four paired arms (39) which are securely attached to the supporting peripheral bars (6) of the casing. It has a plurality of circular openings (40), (40A) in its peripheral and radial walls to accept the ends and the beginnings of pipes that connect it with the interior of each solenoid.

A cross sectional view taken on the plane indicated by the section line 20—20 in FIG. 19 is shown in FIG. 20. The drive shaft (4) supported by roller bearings, runs through its center. Inlet (41) for receiving new fluid, and outlet (42) for old fluid, together with their caps, are provided in its peripheral wall.

The turbine (FIG. 21) consists of a plurality of blades (43) securely attached to a cylinder wheel (44), which is keyed to the drive shaft (4). The cylindrical wheel has a circular chamber (45) which is normally filled with fluid. Since the fluid in this chamber must flow into pipes that lead to each solenoid, and there are two walls (the radical wall of the turbine housing and that of the turbine wheel), the openings (44A) in the inner wall are made in the shape shown in FIG. 21 in order to give added time to the fluid to make an exit into the circular openings (40A) in the corresponding level of the wall of the turbine housing. A channel (45A) is also provided between every two turbine blades to permit the flow of access fluid from between the blades into the central circular chamber (45).

PIPES CONNECTING EACH SOLENOID TO THE TURBINE

Referring to FIG. 22, one pipeline (46) starts from the top section (tt) and another pipe (47) from the bottom section (bb) of each solenoid, and join each other at a point identified as (jj), and then proceeds as a single tube (47A) to communicate with the spaces between the turbine blades. The section identified as (jj) is shown in FIG. 23, wherein "ee" shows the fluid flowing from the lower pipe; "ff" shows the fluid going through the upper pipe. The hinged circular disc (48) is pushed to the left when the current "ee" is flowing toward the turbine, and swings to the right when current "ff" is flowing toward the turbine. Since current "ff" originates from the top section of the solenoid when the piston moves upward, and current "ee" is from the lower section of the solenoid when the piston is moving downward, the two currents never reach point "jj" at the same time. Consequently, no difficulty arises at that point.

FIG. 24 gives a view of the pipes taken on the plane marked by the line 24—24 in FIG. 23.

Pipelines (49) and (50) connect the circular chamber (45) of the turbine with the chamber in each solenoid, the former leading to the top section and the latter to the lower section of the solenoid. The fluid in the circular chamber (45) of the turbine flows into solenoids by centrifugal action, and also by suction of the piston, and naturally the current is unidirectional. However, when the piston compresses the fluid in the solenoid, the centrifugal action may not be strong enough to prevent a back flow of fluid, via pipelines, 49 and 50, into the circular chamber of the turbine. For this reason, pipes (49 and 50) have one-way valves (51) as shown in FIG. 25. Pipelines (46) and (47) do not require such valves.

To insure as much vertical space as possible for the winding and the couplings on each solenoid, the inlets and outlets (24's) of each solenoid are made very elliptic and welded to the elliptic openings (25) of the pipes whose cross sections away from the immediate vicinity of the solenoid are concentric.

THE POLARITY WHEEL

The polarity wheel FIG. 26, which is keyed to the central drive shaft (4), consists of a disc (53), a plurality of magnetic poles (54), and conducting brushes (55). It carries two paired conducting rings, one paired rings (60) on its obverse radial wall, and the other paired rings on its reverse radial wall (61).

The poles of the said wheel, evenly disposed around the said disc and securely attached to the periphery thereof, point in the direction of the field poles (19). The field poles are actually end sections of the permanent magnets (14) shown in FIG. 4.

Each pole of the said wheel is electromagnetic, the terminals of whose winding are attached to the conducting brushes (55) located immediately below the pole. The said brushes are held in paired threaded openings (55A). There are other threaded openings (55B to 55D), and the conducting brushes may be moved to such openings whenever adjustments are required. However, the paired brushes must be installed on the same line that serves as one of the diameters of the said disc.

The said conducting brushes protrude sufficiently outward from the surface of the disc to come in contact with a pair of stationary conducting rings (FIG. 27), which is securely mounted on an insulation and attached to the inner surface of the radial wall (2) of the casing. The said rings and the polarity wheel are coaxial.

THE TWIN RINGS THAT CONTROL THE POLARITY WHEEL

In FIG. 27, stationary conducting rings (56 and 56A) are shown with their negative and positive sector. (The + and − signs are not always placed on the rings, but are placed there in the drawings to make the explanation clearer.) There are same number of + and − sector in the outer and the inner rings. When the outer sector is plus, the corresponding inner section is minus, and vice versa.

FIG. 28 shows the same paired rings unrolled into a paired linear strips with all the minus sections connected with conducting wires. FIG. 29 is the same paired strips, but with their plus sections connected together with conductors. FIG. 30 shows the same paired strips with all the plus sections connected and made to end in a plus terminal (58), and all the minus sections connected and made to end in a minus terminal (59). The wirings shown in FIG. 30 go through the radial wall (2) of the casing, and end as terminals PLUS (58) and MINUS (59) on the outside of the said wall (at locations 5 and 5A).

HOW THE POLARITY WHEEL WORKS

The field poles (19) are permanent magnets and naturally their poles remain constant. The poles of the polarity wheel, however, are electromagnets and are variable. When the current enters one of the terminals (59), it follows the wiring in the casing's wall to reach the stationary paired conducting rings (56 and 56A). From there it goes to the brushes (55), then to the poles (54), and returns through one of the paired routes to the terminal (58). As the polarity wheel moves clockwise and its paired brushes pass over alternately the plus-minus and the minus-plus sections of the stationary paired rings, the poles of the wheel change alternately and maintain the wheel's rotation.

For example, when the variable pole 54A is in the position shown in FIG. 26, just pass the constant field pole 19A SOUTH, and if the brushes (55) are touching sections of the stationary paired rings that cause the current to flow in the winding of the pole 54A in the direction shown by the arrow, pole 54A becomes SOUTH, and will be repelled in a clockwise direction by field pole 19A SOUTH. At the same time, field pole 19B NORTH will pull pole 54A SOUTH further clockwise. When pole 54A SOUTH reaches the position A', its brushes will be touching the paired rings' next plus-minus section, which will cause the current in the pole winding to flow in the direction shown by the arrow, thus causing pole 54A to become NORTH. Field pole 19B NORTH will then repel pole 54A (now NORTH) in a clockwise direction, and field pole 19C SOUTH will attract pole 54A NORTH further clockwise, and so on.

Since every pole of the wheel is going through similar changes at the same time, the polarity wheel exerts considerable torque on the drive shaft.

FIG. 26 shows the detailed windings and wire connections of the polarity wheel. With the help of brushes (55's), all the terminals of its poles are in contact with the stationary paired conducting rings (56 and 56A), which reduce the number of terminals to just two (58 and 59). How this reduction is accomplished is described in detail under the section heading "The Stationary Rings That Control The Polarity Wheel" and in FIGS. 27 to 30 inclusive.

CONDUCTING RINGS FOR THE SOLENOIDS AND PISTONS

Securely mounted on an insulation and held the obverse side of the polarity wheel are a pair of conducting front radial rings (60 and 60A), one inside the other, with their center corresponding to that of the wheel's axis. This is shown in FIG. 31. Unlike the stationary conducting rings (56-56A) that control the rotation of the polarity wheel and located on the inner surface of the casing's radial wall (2), these rings help the polarity wheel to control the solenoids and the pistons.

The outer ring (60A) has a minus section extending from 0° to 180°, and a plus section from 180° to 0°. The inner ring (60) has a plus section extending from 0° to 180°, and a minus section from 180° to 0°, clockwise.

A pair of conducting brushes (63 and 63A) representing the terminals of the lines (62 and 62A) from each solenoid and piston are shown at 0° of the rings. In the preferred embodiment, there are actually eight pairs of the conducting brushes, each pair representing a solenoid and its piston, but they are omitted from the drawing to avoid overcrowding and confusion. All brushes and connections are identical to the pair illustrated in FIG. 31.

FIG. 32A is that of the paired conducting rings shown in FIG. 31 unrolled into two parallel strips. FIG. 32B shows the result of connecting with conductors the two plus sections of FIG. 32A, and the result of connecting the two minus sections of FIG. 32A.

FIG. 33 shows the result of rolling the parallel strips in FIG. 32B into a paired conducting rings. The conductors or wires connecting the plus sections and those connecting the minus sections in FIG. 32B are made to go through the disc of the polarity wheel to form the rear radial rings shown in FIG. 33. These latest rings are mounted securely on the reverse side of the polarity wheel, and are in contact with conducting brushes (64 and 64A) mounted on the casing's radial wall (2).

The axis of every conducting ring described hereinabove is coaxial with that of the polarity wheel.

RETURN PATH OF THE MAGNETIC FLUX

Between the obverse side of the polarity wheel and the reverse side of the magnetic configuration, but closer to the former, is a wheel-like framework (66), shown in FIG. 34, which has a plurality of spoke-like iron bars (68) radiating from the hub (67) to the peripheral ring-like suporting bar (7) of the casing. The central opening of its hub is made considerably larger than the diameter of the drive shaft that goes through it, and the ends of the spoke-like bars are bolted to the casing's peripheral bar.

Aside from serving as return paths for some of the magnetic flux, each spoke-like bar serves as a support for the contacting brushes (63,63A) that hold the terminals of the windings of each solenoid and piston. The said brushes are mounted on insulations which in turn are attached to said spoke-like bar. Each brush is positioned close enough to contact each conducting ring mounted on the obverse side of the polarity wheel.

Since FIG. 34 is not crowded, all the brushes and terminals are shown. Each spoke-like bar supports each pair of brushes connecting the terminals of each solenoid and its piston. Since there are eight solenoids with their pistons in the preferred embodiment, there are eight spoke-like bars for supporting eight paired brushes and their terminals.

HOW THE POLARITY OF THE SOLENOIDS AND PISTONS ARE CHANGED

FIG. 35 is a detailed schematic and pictorial presentation of the wirings and connections of each piston and solenoid. The terminal line (27) of the winding (26) on each solenoid (22) joins the terminal line (62) of the winding (30) of each piston (28) and stops as a brush (63) in contact with inner ring (60), and the terminal line (27A) of each solenoid joins the terminal line (62A) of each piston and ends as a brush (63A) in contact with the outer ring (60A). As the rings (60 and 60A) turn clockwise with the polarity wheel, the paired brushes (63 and 63A) in their sliding contacts alternately pass over the plus-minus and the minus-plus sections of the rings, thus causing the electron current to change its direction. The result is a change of polarity in each solenoid and piston once every 180° of the polarity wheel's rotation.

In order to avoid confusion and overcrowding of the drawing, only one set of paired brushes and their connections to one set of solenoid and piston are shown in detail in FIG. 35. Since there are eight solenoids and eight pistons in the preferred embodiment, there are actually eight paired brushes in contact with the said rings. All the eight paired brushes, including the pair shown in FIG. 35, are mounted on the wheel-like framework (66) with each pair on each spoke as illustrated in FIG. 34. Since the wirings and connections of the eight sets of solenoids and their pistons are substantially identical, the above description and drawing of one set apply to all.

Brushes

FIG. 36 shows the brush in perspective. FIG. 36A is that of a vertical cross section taken through the center of the brush shown in FIG. 36. The conductor is identified as (69), the threaded bottom section as (70), the springs as (72A and 72B), the carbon as (72), and the threaded detachable section as (73). The insulations are identified by the numbers 71 and 71A.

Detailed Views of Conducting Rings

A small representative section of one of the conducting rings is shown in FIG. 37. A cross section of the same part of the ring taken along the line 38—38 of FIG. 37 is shown in FIG. 38, wherein (57) is the insulated section that separates the plus and the minus sections of the ring. A cross-sectional view of the same part of the ring taken along the line 39—39 in FIG. 37 is shown in FIG. 39, wherein (71B) is the insulator, (72C) the springs, (74) the strip holding down an insulator, (76) a copper wire, and (75) the contacting surface.

FIG. 40 shows a conducting brush of the polarity wheel and the four locations where the brush may be screwed into for adjustment in timing.

COOLING, VENTILATION, AND LUBRICATION

Since the casing is constructed more or less like a bird's cage with numerous openings, and the movement of air is helped by the rotating polarity wheel, ventilation is almost automatic. The principal moving parts, such as the pistons, function in or in constant contact with fluids, and the rotating polarity wheel and the turbine wheel are keyed to the drive shaft, there is little or no need for special lubrication or cooling of those parts. Only the few parts or sections in contact with the drive shaft and not keyed to it require lubrication, and they do not pose any problem for they are accessible manually. If desired, a refrigeration unit may be hooked-up to the pipelines from the turbine housing. To start the engine, the polarity wheel must first be put into motion, and that is done simply by turning the current on.

HOW THE COMBINATION FUNCTIONS AS AN ENGINE

By virtue of its power to rotate, the polarity wheel (52) of this engine could perform active functions resembling those of a special purpose computer and a commutator, but with a greater precision than the passive latter.

The current enters the openings marked (5) in the radial wall (2), and reaches the paired stationary conducting rings (56, 56A) mounted on the inner surface of the same wall. The paired brushes (55) of the polarity wheel (52) are always in contact with the said conducting rings. As the paired brushes move clockwise with the polarity wheel, they brush over the sectors "plus-minus", "minus-plus", etc., of the paired rings (FIG. 27). As a result, the direction of the current in the poles of the polarity wheel is changed at regular intervals. This change in the polarity of each pole of the wheel will cause the pole to be repulsed clockwise by a like field pole it has just passed, or attracted clockwise by an unlike field pole immediately ahead of it. In either case, the polarity wheel will rotate unidirectionally.

Another current goes from the terminal (64) to the paired conducting rear radial rings (61, 61A) mounted on the reverse side of the polarity wheel, and then to the paired conducting front radial rings (60, 60A) on the obverse side of the wheel. Each paired conducting brushes (63, 63A) in contact with the paired conducting front radial rings (60, 60A) transmits the current through lines (62) and (27) to each solenoid and piston. Since the paired rings (60) and (60A) are divided into a "plus-minus" sector of 180°, and a "minus-plus" sector of the same arc length, the polarity of each solenoid and piston changes once every 180° of the polarity wheel's rotation.

The energized solenoid (22) could cause the piston (28) located within it to move either up or down. The upper permanent magnet (14) located at the upper end of the solenoid could either pull or repel the same piston. The lower permanent magnet (11) adjoining the lower end of the solenoid could also pull or repel the same piston. On top of all these, the piston itself is electromagnetic with its north and south poles, and could move on its own power. Furthermore there is that magnetic fluid (22A) in every available space in the solenoid to increase the permeability of the magnetic flux.

When all the above magnetic attractions, repulsions, and permeability are coordinated, the piston is not going to remain idle inside the solenoid, but will move with the speed and force that are more than adequate to operate a vehicle of appropriate size.

The coordination of the apparently complex magnetic forces described above is accomplished by a very simple system. The two powerful magnets, one on the upper side and the other on the lower side of each solenoid, are of the permanent kind with fixed polarity, and consequently they do not require special circuits. It means that only the current in the solenoid and the piston must have special circuits. Even this is simplified by making the circuit of the solenoid and that of the piston parallel to each other and then leading the merged lines to brushes (63) and (63A), which are in contact with the paired conducting front radial rings (60) and (60A).

At a given instant, for example, when both the solenoid's and the piston's lower sides are south poles and their upper sides north poles as the result of the turning of the polarity wheel, and if the upper permanent magnet adjoining the upper end of the solenoid is a south pole and the lower permanent magnet that adjoins the lower end of the solenoid is also a south pole, the piston inside the solenoid will move upward since the south pole of the lower permanent magnet will repulse the south pole of the piston, and the south pole of the upper permanent magnet will attract the north pole of the piston. As the polarity wheel turns further clockwise, the polarity of the solenoid and the piston changes, and their upper ends become south poles and their lower ends the north poles. Needless to say, the permanent magnets remain constant. In this new situation, the south pole of the upper permanent magnet repels the south pole of the piston, and the south pole of the lower permanent magnet attracts the north pole of the piston. As a result, the piston now moves downward. The movement of the piston is greatly enhanced by the direction of magnetic flux in the solenoid whose polarity is always the same as that of the piston. Thus the piston moves with great speed and ample power upward during a given 180°, and downward during the next 180°, of every complete rotation of the polarity wheel.

These up and down movements of the piston cause the fluid in the solenoid to be forced into pipes (46, 47) leading into the turbine housing (38). The fluid, after pushing the turbine blades clockwise, descends into a central chamber (45) of the turbine's wheel (44). Centrifugal motion generated by the spinning turbine and the suction of the piston cause the fluid in the turbine's central chamber to return, via pipes (49) and (50), to the solenoid to be recycled. Since the turbine is keyed to the drive shaft, the rotation of the former becomes the rotation of the latter.

The solenoid, piston, permanent magnets, brushes, and pipes described hereinabove, in their working combinations, become ONE WORKING UNIT. The size of each engine determines the number of working units; a two piston engine requires two working units, and a four piston engine needs four. The preferred embodiment is an eight-piston engine with eight WORKING UNITS. There is, of course, one polarity wheel having paired conducting rings on its obverse and reverse sides to control the whole eight WORKING UNITS, and one turbine with a plurality of openings in its housing to receive the currents of fluid from the eight sources.

There is very little, if any, pouring between the ends of each piston and those of the permanent magnets since there is always a body of fluid between the former and the latter. When the engine is not in operation, gravity may cause some pistons to be at the bottom, midway, or upper sections of the solenoids, but it would not be a problem for all the pistons will align themselves into proper position when the current is turned on and the polarity wheel is put into motion.

CONTROLS AND SAFETY DEVICES

The present invention does not include, and no claim is made on, starter and control boxes, rheostats, fuses, switches, meters, speed regulators, storage batteries, capacitors, and relays. Such devices (many of them patented or unpatentable) are available in the markets, and are highly reliable, and the working principles and installations of which are very familiar to any one skilled in the art. The present engine requires good storage batteries, starting and controlling boxes are available commercially as patented or unpatented products, and such box or boxes must include a component that could protect adequately the engine from the surge of current when the switches are turned on. On a moving vehicle, the engine may use the frame as a ground when the conventional return line is not preferred. When the engine is used as a stationary power plant, it should be grounded.

Although the invention has been described hereinabove with reference to the preferred embodiment, various modifications can be made without departing from its scope and spirit. It is my intention to cover in the appended claims all modifications of this invention that are within its scope and spirit.

Having thus described my invention in the above specification, and having illustrated the same in the accompanyings, I hereby claim for the purpose of securing letters patent therefor, the following:

1. An electromagnetic piston engine for converting electromagnetic energies into mechanical movements, comprising, in unique and useful combinations,
   (a) a substantially cylindrical casing having disklike radial walls with inlets and outlets for electric lines, cylindrical cage-like wall constructed of evenly spaced bars running axially, reinforcing ribs running circumferentially, and a central opening with roller bearings in each of the said radial walls;
   (b) a main shaft running through said central opening of each of said radial walls;
   (c) a plurality of evenly spaced permanent magnets, arranged in a circle and securely held to the inner surface of one of the said reinforcing ribs, and having their free polar ends pointing in the general direction of said shaft;
   (d) stationary conducting rings consisting of comparatively large ring enclosing a slightly smaller ring without direct contact between them, both rings divided by insulating strips into even number of corresponding sectors, such that a diametral line drawn through a midsection of any sector of the inner ring will pass through the midsection of the corresponding sector of the larger ring,
      (1) said conducting rings being mounted on the inner surface of the said radial wall and protected by proper insulation, and having their center aligned with the axis of said radial wall;
      (2) said outer ring having its sectors marked + − + − .... in a clockwise order, and the corresponding sectors of the inner ring marked with the symbols − + − + .... in a clockwise order;
      (3) said minus sectors of both rings connected to a conductor that carries electron current away from its source of supply, and said plus sectors of both rings connected to a conductor that carries current back to the same source of supply, thus making it possible for an electromagnet to change its polarity everytime its terminals brush over from "+ − " sectors to " − + " sectors, or vice versa, or said rings;
   (e) a polarity wheel, designed for reversing the direction of electron current in electromagnetic poles and solenoids, comprising, in combination,
      (1) a concentric disk having a central opening to receive the said main shaft, which is keyed thereto, and positioned close to the said stationary conducting rings;
      (2) a plurality of evenly spaced electromagnetic poles securely attached to the periphery of said disk, and extending outwardly towards the polar ends of the permanent magnets described in section (c) above, but stopping short of touching the latter, each pole having windings of insulated conductors, one terminal of which attached to the closest conducting brush, and the other end to the next closest brush, and the other end to the next closest brush, said brushes being the ones described in subsection that follows;
      (3) a plurality of conducting brushes arranged in pairs on the reverse side of the said wheel, each pair securely held in insulation, which in turn attached to the wheel's radial surface near the base of each pole, and the whole forming a circular pattern whose center aligning with that of the said wheel, said paired brushes extending axially to be in constant contact with the stationary conducting rings described in section "d" hereinabove, thus causing the polarity of the electromagnets to change periodically as the said brushes sweep over the said conducting rings;
   (f) conducting rear radial rings consisting of an inner and an outer rings, the former in touch by means of brush to the conducting wire that carries current from its source of supply, and the latter in contact by means of brush to the line that carries current back to the same source of supply, said rings securely mounted on the reverse side of said polarity wheel, but insulated therefrom, and their center aligned with that of the said wheels;
   (g) conducting front radial rings consisting of an inner and an outer rings, mounted on insulation and securely attached to the obverse surface of the said polarity wheel, the outer ring having its first 180° sector marked as the plus sector, and its second 180° sector as its minus sector, and the inner ring having its first 180° sector marked as its minus sector and its second 180° sector as its plus sector, said rings having their minus sectors interconnected by means of a conductor that goes through the said wheel and connected to the rear minus ring, and their plus sectors also interconnected by a separate wire that goes through the said wheel to be attached to the rear plus ring, said front rings, by virtue of their rotary contacts, permitting a direct current to flow into one terminal and out of the other terminal, or vice versa, of the solenoids in the circuit, thus reversing the latter's polarity at the same speed as the rotation of the polarity wheel;
   (h) a configuration of magnetic sets, each set arranged in the shape of an oversized spoke, identified herein simply as spoke, radiating from a common hub and forming an overall appearance of a wagon wheel, comprising, in combination,
      (1) a plurality of evenly spaced paired spokes having their lower ends merged and securely attached to a common hub that provides a passageway for the main shaft, each spoke consisting of an elongated permanent magnet whose one end starting from the said hub and whose other end coupled to the lower end of a solenoid, and the upper end of the solenoid, in turn, coupled to the lower end of a second permanent magnet whose upper elongated section being bent over the said polarity wheel to become a field pole of the wheel;

(2) a plurality of insulated windings on each of the said permanent magnets having terminals marked "+" and "−" and left unconnected by any source or energy, except in emergencies requiring reenergizing of said magnets;

(3) a plurality of insulated windings in each of the said solenoids, which constitute the middle sections of each spoke, the terminals of which in contact with the front conducting rings of the said polarity wheel;

(4) a number of pipelines originating and ending in the intermediate section of the said spoke and permitting the inflow and outflow of fluids;

(i) a plurality of pistons designed to pump fluids for operating a turbine and to be cooled by the flowing fluids in which they are immersed, each piston occupying a space inside a solenoid of each of the said spokes, and consisting of (1) a solid cylindrical ferrous body with layers of insulated windings, all enclosed in (2) a watertight nonmagnetic cylindrical container, and (3) terminals from said windings passing through said container to be in sliding contact with conductors that lead to and from the front rings of said polarity wheel, said pistons moving reciprocatingly or in pumping action with every reversal of its polarity by the rotation of the said polarity wheel;

(j) a turbine unit consisting of (1) a cylindrical housing having a central opening and roller bearings supporting the main shaft, and inlets and outlets in its walls permitting fluids to enter and leave the same;

(2) a plurality of pipes communicating the interior of the solenoids and the turbine housing;

(3) a cylindrical turbine wheel, keyed to said main shaft, and occupying the said housing, and rotated by streams of fluid pumped by said pistons in said solenoids, and carried by said pipes;

(k) lubricating means.

2. The electromagnetic piston engine as claimed in claim 1, wherein the said polarity wheel comprising, in practical and unique combinations, (a) a DISK having the central drive shaft passing through its axis, and keyed to said shaft;

(b) a plurality of magnetic POLES securely attached to, and protruding outwardly from, the periphery of said disk, and stopping short of touching the field poles that extend from the casing's wall, each pole having an insulated conductor wound in layers around it in a closely packed form;

(c) paired CONDUCTING BRUSHES connected to the extended terminals of the windings of each of the said poles, and mounted securely in insulated paired grooves on the reverse side of said wheel, each brush positioned separately from the other, but both on the same diametrical line of said wheel, and protruding axially far enough to be in contact with said conducting rings mounted on the inner surface of the casing's radial wall;

(d) a pair of CONDUCTING RINGS having insulated base securely mounted on the reverse of said wheel, and another (e) pair of CONDUCTING RINGS having insulated base securely mounted on the obverse side of said wheel, both paired rings being coaxial with said wheel.

3. The electromagnetic piston engine as claimed in claim 1, wherein the said configuration of permanent magnets and electromagnets having a general shape resembling that of an evenly spaced oversized spokes radiating from a hub, said configuration comprising, in new and useful combinations, (a) a plurality of ELONGATED permanent MAGNETS having their lower section joined together in pairs and slightly rounded and then attached to the hub, each magnet extending in the direction of the casing's periphery and terminating at a point one-third the radius of the casing as measured from the hub, then followed by a solenoid containing a piston and occupying a space equal to about one-third of the same radius, and finally succeeded by the upper permanent magnet which proceeds to the periphery where it bends over to the reverse side to serve as a field pole of the same polarity wheel;

(b) a plurality of SOLENOIDS, each solenoid occupying the space described above, and having its lower side securely attached to the upper end of the permanent magnet that proceeds upward from said hub, and its upper side securely attached to the lower end of the upper permanent magnet that proceeds on to said periphery;

(c) insulated conducting WIRES that are not required to carry current while the engine is in operation, and that wind in a tight helix around each permanent magnet to energize the same whenever necessary;

(d) insulated conducting WIRES that carry current while the engine is in operation, and that wind in a tight helix around each solenoid and piston;

(e) a wheel-like FRAMEWORK, located close to the configuration and forming an adjunct thereof, having hub-like circular ring that encircles the power shaft, but not touching it, and having flat spoke-like arms, evenly spaced, and radiating from said ring to the periphery of the casing where they are securely attached, said framework serving as return paths for the magnetic flux and supports for electrical terminals;

(f) a straight PASSAGEWAY having an elliptic cross section bored along the axis of each of the upper permanent magnets located between each solenoid and the periphery of the casing, said passageway communicating with the interior of said solenoid at and the exterior at the periphery.

4. The electromagnetic piston engine as claimed in claim 1, wherein each of the said solenoids comprising, in improved and useful combinations, (a) a CYLINDRICAL TUBE with threaded ends that could fit into the corresponding threaded ends of the said permanent magnets between which it is positioned;

(b) an insulated CONDUCTOR wound closely in a helix and in layers around said tube with the terminals leading to the said front conducting rings on said polarity wheel;

(c) a MAGNETIC-FLUID CORE made of finely powdered magnetic particles and fluids composed of about equal proportions of water, oil, alcohol, and ethylene glycol, said powdered particles and the combined fluids mixed in the proportion of at least one cubic centimeter of the former in every liter of the latter;
(d) a plurality of ELLIPTIC OPENINGS in said cylindrical tube for outgoing and incoming fluids.

5. The electromagnetic piston engine as claimed in claim 1, wherein each of the pistons comprising, in practical and unique combinations,
(a) a CORE made of laminated iron alloy;
(b) an insulated CONDUCTOR wound closely around and in layers on said core;
(c) a water-proof cylindrical CONTAINER large enough to hold the said core, but small enough to fit into the interior of said solenoid, said container having a plurality of seals encircling its upper and lower sections;
(d) a strong and comparatively thick walled nonmagnetic TUBE having an elliptic cross section whose lower end being securely anchored or held in the axial center of said container and core, and its upper section extending into a passageway having an elliptic cross section, the said passageway being the one bored axially through each of the permanent magnets in contact with the casing's periphery;
(e) two CONDUCTING STRIPS disposed diametrically opposite of each other inside said tube and connected to the terminals of the windings on the piston's core, and having their insulated sides securely attached to the tube's wall and their exposed side facing toward the tube's axis;
(f) a nonmagnetic rod with an insulated covering having attached to it two conducting strips, one on each side, and having its lower section inserted inside the aforesaid tube with its conductors in contact with those of the latter, and its upper end and conductors in contact with a pair of brushes whose lines lead to the said front conducting rings on the aformentioned polarity wheel.

6. The electromagnetic piston engine as claimed in claim 1, wherein the said turbine housing comprising, in a new and practical combination,
(a) a hollow CYLINDRICAL BODY with
(b) a plurality of OPENINGS for pipings in its radial wall that faces the solenoids;
(c) threaded INLET and OUTLET with caps for filling and draining;
(d) a central opening with BEARINGS for the support of the drive shaft;
(e) a plurality of circular openings in its peripheral wall for pipes carrying fluid from each of the said solenoids.

7. The electromagnetic piston engine as claimed in claim 1, wherein the said turbine housing containing a new and practical turbine, said turbine comprising, in functional combinations,
(a) a CYLINDRICAL WHEEL having
(b) a HOLLOW INTERIOR that serves as a reservoir for fluid, transient and otherwise,
(c) a plurality of TURBINE BLADES securely attached to its peripheral surface,
(d) a plurality of ELLIPTIC OPENINGS in its radial wall, said openings in communication with concentric openings in the turbine housing,
(e) a plurality of PASSAGEWAYS that permit the flow of excess fluid from between said blades into said hollow interior, and
(f) an AXIAL PASSAGEWAY for the drive shaft to which it is keyed.

* * * * *